Patented Feb. 8, 1944

2,340,907

UNITED STATES PATENT OFFICE 2,340,907

PROCESS FOR THE PREPARATION OF ALKOXY-SUBSTITUTED ALCOHOLS

Sidney Sussman and William F. Gresham, Wilmington, Del., assignors to E. I. du Pont de Nemours & Company, Wilmington, Del., a corporation of Delaware No Drawing. Application March 5, 1940,
Serial No. 322,344

10 Claims. (Cl. 260—615)

This invention relates to a new class of valuable organic substances which can be obtained by reacting saturated or unsaturated aliphatic alcohols with di hetero atomic ring compounds in which the hetero atoms are oxygen; alkoxy alkoxy aliphatic alcohols are thereby formed.

The alcohols which may be employed in this reaction include such alcohols as methanol, ethanol, iso- and n-propanol, iso- and n-butanol (which may be characterized as the low molecular weight alcohols), and the higher straight and branched chain monohydric aliphatic alcohols; cyclic alcohols, such as the cyclohexanols; the aromatic alcohols, such as benzyl alcohol and tolyl alcohol; the unsaturated alcohols, such as allyl alcohol and methyl allyl alcohol; the polyhydric alcohols, such as ethylene glycol, propylene glycol, glycerol, and alkyl ethers of these alcohols, such as the mono methyl, mono ethyl, mono propyl, and mono methoxy methyl ethers of ethylene glycol, and other ether alcohols which contain at least one free hydroxyl group.

The heterocyclic compounds which may be used contain 2 oxygen hetero atoms, while the C-atoms may be substituted or not. These compounds may be designated as cyclic glycol formals and more particularly the cyclic glycol formals conforming to the empirical formula:

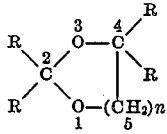

in which the R groups are similar or dissimilar hydrogen or hydrocarbon groups (more especially akyl groups such as methyl, ethyl, n- and iso-propyl, and n- and iso-butyl) and n is an integer; specific examples of which are 1,3 dioxolan (ethylene glycol formal),

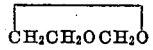

and 4 methyl 1,3 dioxolan, (propylene glycol formal),

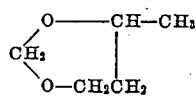

and 4,4 dimethyl 1,3 dioxolan,

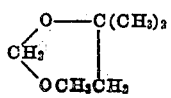

The reaction proceeds in the presence of from 0.1 to 10% (by weight of the formal) of an acidic-type catalyst, such as sulfuric acid, paratoluene sulphonic acid, phosphoric acid, hydrochloric acid and the like, and at temperatures ranging between approximately 50° and 150° C. The alcohols may be used substantially in accord with stoichiometric requirements i. e. equimolecular proportions although an excess is recommended with up to in the order of 3 mols of the monohydric, and in the order of 8 mols of the polyhydric alcohol or ether per mole of the cyclic formal.

*Example 1.*—97 parts by weight of an azeotrope, boiling at approximately 61° C. and containing by weight 41.4 parts of methanol and 58.6 parts of 1,3-dioxolan was refluxed for one hour in the presence of approximately 2 parts by weight of concentrated sulfuric acid. In order to neutralize the sulfuric acid present, the resulting reaction mixture was treated with approximately 10 parts by weight of a 30 per cent solution of sodium methoxide in methanol. Other suitable alkalies may be used, such as sodium, barium, or potassium hydroxide, or carbonate or other alkali metal or akaline earth metal alkoxides. The thus neutralized reaction product was then fractionated and 17 parts of (methoxy methoxy) ethanol was obtained.

*Example 2.*—A mixture containing 296 parts by weight of dioxolan, 496 parts by weight of ethylene glycol, and 7 parts by weight of concentrated sulfuric acid was heated on a steam bath for approximately 4 hours. During this time, the reaction mixture did not boil and subsequent to the reaction, the acid present in the mixture was neutralized with sodium methoxide and upon distillation 218 parts of di-beta hydroxy ethyl formal $CH_2(OCH_2CH_2OH)_2$ was obtained in a yield, based on the dioxolan used, of approximately 40%. This product is a water-white liquid more viscous than glycol, soluble in water, methanol, and methylal and insoluble in ether and benzene. It has a density of 1.1502 at 25° C. and a refractive index of 1.4475 at 20° C.

The products of the reaction are useful as intermediates in the preparation of organic compounds and are likewise useful as solvents, e. g., of regenerated cellulose, cellulose derivatives, such as cellulose acetate, cellulose nitrate, the ethers of cellulose and as solvents, plasticizers and conditioning agents for natural and synthetic resins.

We claim:

1. A process for the preparation of an aliphatic formal-alcohol which comprises contacting an aliphatic alcohol and a 1,3-dioxolane with an acidic catalyst.

2. A process for the preparation of an aliphatic formal-alcohol which comprises contacting an aliphatic monohydric alcohol and a 1,3-dioxolane with an acidic catalyst.

3. A process for the preparation of an aliphatic formal-alcohol which comprises contacting an aliphatic polyhydric alcohol and a 1,3-dioxolane with an acidic catalyst.

4. The process of claim 1 in which the acid catalyst is made neutral and the product then recovered by distillation.

5. A process for the preparation of an aliphatic formal-alcohol which comprises reacting an aliphatic monohydric alcohol and 1,3-dioxolane with an acidic catalyst at a temperature between 50 and 150° C., subsequently neutralizing the catalyst and recovering the formal-alcohol therefrom by fractional distillation.

6. A process for the preparation of (methoxy methoxy) ethanol which comprises contacting methanol and 1,3-dioxolan with a sulfuric acid catalyst.

7. A process for the preparation of (ethoxy methoxy) ethanol which comprises contacting ethanol and 1,3-dioxolan with a sulfuric acid catalyst.

8. A process for the preparation of (methoxy methoxy) ethanol which comprises contacting methanol and 1,3-dioxolan with an acidic catalyst, and after the reaction has substantially reached equilibrium, neutralizing the catalyst and recovering the (methoxy methoxy) ethanol from the reaction mixture by fractionation.

9. A process for the preparation of (methoxy methoxy) ethanol which comprises refluxing an azeotrope containing 41.4 per cent methanol and 58.6 per cent 1,3-dioxolan at substantially its boiling point (61° C.) in the presence of sulfuric acid as the catalyst, and after equilibrium has been substantially established, neutralizing the reaction mixture with sodium methoxide and subsequently recovering (methoxy methoxy) ethanol by fractionation from the resulting neutralized reaction product.

10. A process for the preparation of di-beta hydroxy ethyl formal which comprises reacting approximately 296 parts of dioxolan, approximately 496 parts of ethylene glycol, and approximately 7 parts of concentrated sulfuric acid at approximately 100° C. for approximately 4 hours, subsequently neutralizing the sulfuric acid with sodium methoxide, and recovering the di-beta hydroxy ethyl formal by distillation.

SIDNEY SUSSMAN.
WILLIAM F. GRESHAM.